US008500139B1

(12) United States Patent
Andrews et al.

(10) Patent No.: US 8,500,139 B1
(45) Date of Patent: Aug. 6, 2013

(54) ATTACHABLE SCOOTER

(71) Applicant: Phil and Teds Design Limited, Wellington (NZ)

(72) Inventors: James Richard Andrews, Wellington (NZ); Andrew Douglas Mawson, Wellington (NZ); Campbell Douglas Gower, Newton (NZ)

(73) Assignee: Phil and Teds Most Excellent Buggy Company Limited, Newtown, Wellington (NZ)

( * ) Notice: Subject to any disclaimer, the term of this patent is extended or adjusted under 35 U.S.C. 154(b) by 0 days.

(21) Appl. No.: 13/791,196

(22) Filed: Mar. 8, 2013

Related U.S. Application Data

(63) Continuation of application No. 13/809,358, filed as application No. PCT/NZ2011/000133 on Jul. 15, 2011.

(30) Foreign Application Priority Data

Jul. 16, 2010 (NZ) ........................................ 586837

(51) Int. Cl.
*B62D 63/06* (2006.01)
(52) U.S. Cl.
USPC ................ 280/32.7; 280/87.041; 280/87.051; 280/657; 280/658; 280/304.1; 280/656; 280/647; 280/648
(58) Field of Classification Search
USPC ........ 280/32.7, 304.1, 656, 647, 648, 87.041, 280/87.051, 657, 658
See application file for complete search history.

(56) References Cited

U.S. PATENT DOCUMENTS

| 8,540,238 | | 4/2003 | Yang | |
|---|---|---|---|---|
| 6,805,368 | B1 * | 10/2004 | Chen | ......................... 280/87.041 |
| 6,830,255 | B2 * | 12/2004 | Cheng | ....................... 280/87.041 |
| 6,866,275 | B1 * | 3/2005 | Puzey | .......................... 280/87.05 |
| 2001/0033069 | A1 | 10/2001 | Ivers | |
| 2006/0290081 | A1 | 12/2006 | Baum | |

FOREIGN PATENT DOCUMENTS

WO   01 66408 A1   9/2001

OTHER PUBLICATIONS

International Searching Authority, "Notification of Transmittal of the International Search Report and the Written Opinion of the International Searching Authority , or the Declaration," for PCT/NZ2011/000133, May 29, 2012.
International Preliminary Examining Authority, "Notification of Transmittal of International Preliminary Report on Patentability," for PCT/NZ2011/000133, Oct. 26, 2012.
Razor USA LLC, www.razor.com, accessed Jan. 9, 2013.
Pulse Performance Products, www.pulsescooters.com, accessed Jan. 9, 2013.

* cited by examiner

*Primary Examiner* — Tashiana Adams
*Assistant Examiner* — Marlon Arce
(74) *Attorney, Agent, or Firm* — Perkins Coie LLP (57) ABSTRACT

A scooter 1 is disclosed that may be linked to a child buggy or perambulator 100. A linking mechanism 200 is also disclosed for releasably linking the scooter 1 to the child buggy 100 thereby allowing the scooter 1 to be used as a scooter 1 or instead, to be linked to a buggy 100 and used in a linked configuration. The combination of a child buggy 100 and scooter 1 using the linking mechanism 200 is described along with a method of use of the mechanism 200.

11 Claims, 11 Drawing Sheets

ATTACHABLE SCOOTER

RELATED APPLICATIONS

This application is continuation of U.S. patent application Ser. No. 13/809,358, filed Jan. 9, 2013, which is a 35 U.S.C. 371 National Stage application of PCT/NZ2011/00133, filed Jul. 15, 2011, which claims priority to NZ586827, filed Jul. 16, 2010, each of which is hereby incorporated by reference in its entirety.

TECHNICAL FIELD

Described herein is an attachable scooter. More specifically there is described a scooter that may be linked via a linking mechanism to a child buggy or perambulator. The linking mechanism, combined buggy and scooter as well as the method of use are described.

BACKGROUND ART

Scooters comprising a footrest, wheels and a handle are well known in the art with many children and adults riding such scooters.

Child buggy's or perambulators are also well known in the art, typical designs including those produced by the applicant.

It is not uncommon for families to have siblings of differing ages or for a caregiver or parent to be out with children of differing ages. Typically, one child may be in a child buggy while the other child may be on a scooter while the parent or parents or caregiver walk or run pushing the child buggy while the child uses their scooter.

A situation that can arise is that the child riding the scooter becomes tired or simply no longer wishes to propel itself on the scooter. The parent or caregiver then has no easy way to store the scooter and carry the child.

Another similar scenario is where the child riding the scooter is no longer young enough to fit inside a child buggy yet wants to have a break from walking itself and still use the scooter in a guided way.

An existing product to partly address these situations is a board or platform that may be fitted to a bar on the frame of the child buggy. The child simply steps onto the platform and can be pushed along by the parent or caregiver. The platform resolves the issue of being able to transport the child but is not detachable and able to be played with independent of the buggy.

It should be appreciated that it would be useful to provide a scooter for a child that may be releasably attached to a child buggy frame allowing use in both a free configuration and for use when attached to the child buggy.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the attachable scooter disclosed herein will become apparent from the ensuing description that is given by way of example only.

SUMMARY

The application broadly relates to a scooter that may be linked to a child buggy. The two items are linked via a linking mechanism.

For the purposes of this specification, the term 'child buggy', 'buggy', 'perambulator' and grammatical variations thereof collectively and interchangeably refer to child carrying and supporting products used to transport one or more children. The child/children may be babies or toddlers.

In a first aspect there is provided a scooter including:
(a) a body made up of;
   a deck chassis having a footrest surface;
   a handle bar assembly;
   at least one rear wheel and at least one front wheel each supported by the body and rotatable around an axis, wherein the deck chassis extends between the front wheel and the rear wheel; and
(b) at least one linking member on the scooter that engages a linking mechanism used releasably attach the scooter to a child buggy thereby linking the scooter to the child buggy.

In a second aspect, there is provided a scooter substantially as described above wherein the at least one rear wheel is movable via a castor assembly from a first position when the scooter is not linked to a child buggy to a second position when the scooter is linked to a child buggy.

In a third aspect there is provided a linking mechanism that links a scooter to a child buggy including:
   a base section having a first end that engages at least one frame member on the child buggy and a second end that receives at least one scooter linking member;
   wherein the first end of the base section mates with a fixing section about the at least one frame member of the child buggy; and
   wherein the second end of the base section mates with a plate cover section and which contains there between a plate;
   wherein the second end of the base section, plate cover and plate have at least one aperture there-between into which the scooter link member or members maybe inserted and retained therein.

In a fourth aspect there is provided a child buggy engaged to a scooter via the linking mechanism substantially as described above.

In a fifth aspect there is provided a method of linking a child buggy and a scoot via a linking mechanism substantially as described above by the steps of:
   (a) inserting the linking member or members of the scooter into the base section second end aperture or apertures;
   (b) moving the plate in a horizontal plane relative to the base section and plate cover allowing the linking member or members to fully insert through the plate and plate cover and subsequently centralising the plate thereby engaging the linking member or members; and
   (c) linking the base section first end and fixing section about at least one support frame member on the child buggy.

BRIEF DESCRIPTION OF THE DRAWINGS

Further aspects of the application will become apparent from the following description that is given by way of example only and with reference to the accompanying drawings in which.

DETAILED DESCRIPTION

The scooter and linking mechanism are now described in further detail. As noted above, the application broadly relates to a scooter that may be linked to a child buggy. The two items are linked via a linking mechanism.

In a first aspect there is provided a scooter including:

(a) a body made up of:
- a deck chassis having a footrest surface;
- a handle bar assembly;
- at least one rear wheel and at least one front wheel each supported by the body and rotatable around an axis, wherein the deck chassis extends between the front wheel and the rear wheel; and b) at least one linking member on the scooter that engages a linking mechanism used to releasably attach the scooter to a child buggy thereby linking the scooter to the child buggy.

The scooter may include at least one linking member or members that protrude from the deck chassis and wherein the linking member or members engage a receiving aperture or apertures in the linking mechanism.

The linking member or members may be one or more protrusions extending from the deck chassis. In one option, the protrusion or protrusions may be approximately cylindrical shaped.

In some embodiments, the linking member or members may be located approximate the front wheel or wheels end of the deck chassis.

The linking mechanism that links the scooter to the child buggy may include:
- a base section having a first end that engages at least one frame member on the child buggy and a second end that receives at least one scooter linking member;
- wherein the first end of the base section mates with a fixing section about the at least one frame member of the child buggy; and
- wherein the second end of the base section mates with a plate cover section and which contains there between a plate;
- wherein the second end of the base section, plate cover and plate have at least one aperture there-between into which the scooter linking member or members maybe inserted and retained therein.

The scooter base section may be movable in a horizontal alignment along the horizontal frame member or members of the buggy. As may be appreciated, this allows the user to place the scooter to one side of the buggy frame when linked to a buggy meaning the user can stand to one side of the scooter when pushing the buggy as opposed to having to stand astride the buggy were the scooter centrally mounted.

The plate and scooter linking member or members may engage together to retain the link member(s) within the aperture(s).

The plate may engage one or more recesses on the scooter linking member or members. In some embodiments the recess may be a continuous channel around the circumference of a rod shaped scooter linking member. In some embodiments, the two rod shaped linking members may be used.

The plate may be movable in a horizontal orientation relative to the second end of the base section and plate cover from a scooter linking member engaged position to a non-engaged position. Movement of the plate may be urged via an actuator. In some specific embodiments, two actuators being push buttons may be used, located on either side of the plate.

The linking mechanism may include a bias means that biases the plate to an engaged position that retains the scooter linking member or members in the aperture or apertures. Optionally, the bias means may be a spring.

In a second aspect there is provided a scooter substantially as described above wherein the at least one rear wheel may be movable via a castor assembly from a first position when the scooter is not linked to a child buggy to a second position when the scooter is linked to a child buggy.

In the above embodiments, the rear wheel may pivot between the first position and second position around a vertical axis located on the castor assembly.

The castor assembly may include:
- a castor mounted to the deck chassis including a caster base, a swivel pivot top and swivel pivot bottom; and
- a castor arm linking the wheel and cast.

The castor may include a pin therein that is biased via a bias means such as a spring towards a cam surface on the castor arm. The action of the cam may be such that, as the wheel and arm are rotated about a vertical axis between positions, the cam surface urges the biased pin to engage in either the first position or the second position. In some embodiments, the cam surface may have ramped surfaces that urge the pin via the bias means to be retained in either the first or second position.

In some embodiments, in the first position the rear wheel or wheels may be received within an aperture in the deck chassis and the wheel or wheels are retained in a fixed horizontal alignment via at least one protrusion from the deck chassis that abuts the caster arm, in this first position, the scooter rear wheel or wheels may be moved closer to the deck chassis vertically so as to place the foot rest surface of the deck chassis in a substantially horizontal alignment.

In the above embodiments, in the second position, the rear wheel or wheels are free to rotate in a horizontal plane. Up to 360 degrees rotation is possible owing to the castor design. In this second position, the scooter rear wheel or wheels may be moved away from the deck chassis vertically so as to place the footrest surface of the deck chassis in a substantially horizontal alignment. Lifting the rear wheel may be preferable as the front wheel(s) are lifted by the linking mechanism to link to the child buggy frame.

In some embodiments, the scooter may have two front wheels and one rear wheel although it should be appreciated that other embodiments and configurations may also be used without departing from the scope of the invention. A double front wheel configuration provides a wider base to use to link the scooter to the child buggy thereby conferring a stronger linkage. In these embodiments, the two front wheels may be linked via a truck assembly in a similar manner to that used in skateboards where, as the scooter chassis is leaned over, the front wheels turn in the direction of lean.

In some embodiments, the handle is fixed to the deck chassis so that it moves with the board relative to the front truck akin to the deck movement of a skateboard. In alternative embodiments, the handle is rotatable relative to the deck about a steering axis in a similar manner to single wheel scooter designs currently available on the market.

In addition, the handle of the scooter may be releasably attached to the deck chassis. Removal of the handle may be useful when the scooter is in the linked configuration with the child buggy thereby allowing more room for the child to hold the buggy rather than the scooter handle.

In a third aspect there is provided a inking mechanism that links a scooter to a child buggy including:
- a base section having a first end that engages at least one frame member on the child buggy and a second end that receives at least one scooter linking member;
- wherein the first end of the base section mates with a fixing section about the at least one frame member of the child buggy; and
- wherein the second end of the base section mates with a plate cover section and which contains there between a plate;
- wherein the second end of the base section, plate cover and plate have at least one aperture there-between into which the scooter link member or members maybe inserted and retained therein.

Optionally, in the finking mechanism above, the plate and scooter linking member or members may engage together to retain the link member(s) within the aperture(s). The plate may engage one or more recesses on the scooter linking member or members. In some embodiments the recess may be a continuous channel around the circumference of one or more rod shaped scooter linking members.

In some embodiments, the plate may be movable in a horizontal orientation relative to the second end of the base section and plate cover from a scooter linking member engaged position to a non-engaged position. Movement of the plate may be urged via an actuator. In some specific embodiments, two actuators being push buttons may be used, located on either side of the plate.

In some embodiments the linking mechanism may include a bias means that biases the plate to an engaged position that retains the scooter linking member or members in the aperture or apertures. In one option, the bias means may be a spring.

The scooter base section may be movable in a horizontal alignment along the horizontal frame member or members of the buggy. As noted above, this allows the user to place the scooter to one side of the buggy frame when finked to a buggy meaning the user can stand to one side of the scooter when pushing the buggy as opposed to having to stand astride the buggy were the scooter centrally mounted.

In a fourth aspect there is provided a child buggy engaged to a scooter via the linking mechanism substantially as described above.

In a fifth aspect there is provided a method of linking a child buggy and a scooter via linking mechanism substantially as described above by the steps of:
- (a) inserting the linking member or members of the scooter the base section second end aperture or apertures;
- (b) moving the plate in a horizontal plane relative to the base section and plate cover allowing the linking member or members to fully insert through the plate and plate cover and subsequently centralising the plate thereby engaging the linking member or members; and
- (c) linking the base section first end and fixing section about at least one support frame member on the child buggy.

As should be appreciated from the above description there is provided a scooter, a linking mechanism, a child buggy and scooter linked together and a method of releasably attaching the scooter to the child buggy. The various configurations allow a child to use the scooter independent of a buggy as per a normal scooter. However, when the child wants to be pushed, the scooter can easily be linked with the child buggy and the child can still stand on the scooter and be pushed along with the buggy. The linked configuration allows both options of travel for the child and gives the parent or caregiver more options for exploration.

The embodiments described above may also be said broadly to consist in the parts, elements and features referred to or indicated in the specification of the application, individually or collectively, and any or all combinations of any two or more said parts, elements or features, and where specific integers are mentioned herein which have known equivalents in the art to which the embodiments relate, such known equivalents are deemed to be incorporated herein as if individually set forth.

Where specific integers are mentioned herein which have known equivalents in the art to which this invention relates, such known equivalents are deemed to be incorporated herein as if individually set forth.

The above described scooter, linking mechanism, buggy and method of use are now described by reference to a working example illustrating one embodiment and variations thereof.

WORKING EXAMPLES

The scooter attachment is now described with reference to a detailed description of various embodiments of the scooter, child buggy, linking mechanism and method of use of the same.

Figure 1:
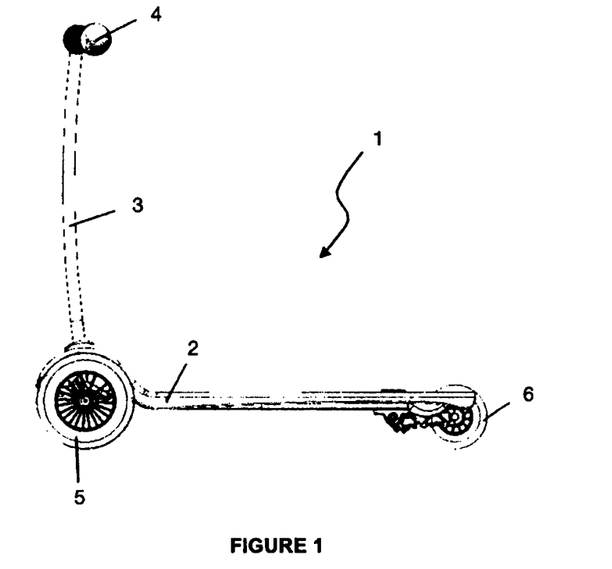
FIG. 1 shows a side elevation view of a scooter.

Referring to FIG. 1, a scooter generally indicated by arrow 1 according to some embodiments is illustrated. The scooter comprises a deck chassis 2, a handle bar 3, handle 4, front wheels 5 and a rear wheel 6. As should be appreciated, a single front wheel 5 may be used or multiple rear wheels 6 used without departing from the scope of the invention. The front wheels 5 are mounted to the deck chassis 2 via a truck 8 (see below) that operates in a similar manner to a skateboard truck. The scooter 1 rear wheel 6 in FIG. 1 is illustrated in the first position with the rear wheel 6 located within an aperture in the deck chassis 2 and the deck chassis 2 is substantially horizontally aligned. The handle bar 3 and handle 4 are fixed to the deck chassis 2 so that the handle bar 3 and handle 4 move with the chassis 2 relative to the truck 8. In alternative embodiments (not shown), the handle bar 3 may rotatable relative to the deck chassis 2 about a steering axis in a similar manner to single wheel scooter designs currently available on the market.

In addition, the handle bar 3 of the scooter 1 may be releasably attached to the deck chassis 2. Removal of the handle bar 3 and handle 4 may be useful when the scooter 1 is in the linked configuration with the child buggy 100 thereby allowing more room for the child to hold the buggy 100 rather than the scooter handle 4.

Figure 2:
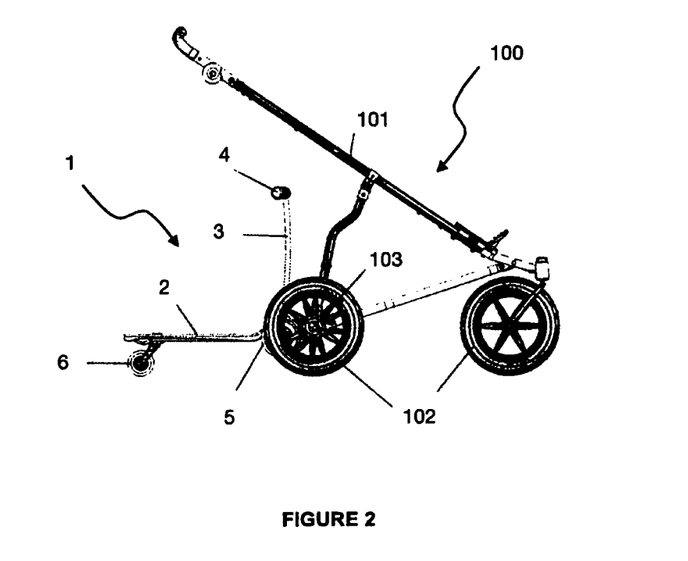
FIG. 2 shows a side elevation view of the scooter linked to the frame of a child buggy or perambulator.

FIG. 2 illustrates the scooter 1 linked to a child buggy generally indicated by arrow 100. The child buggy 100 comprises a frame 101 and three wheels 102. In the embodiment illustrated, the buggy frame 101 includes a tubular section at the rear wheel axle 103 onto which the scooter 1 may be mounted. It should be appreciated that other parts of the frame 101 may be used for mounting the scooter 100 or even a specific frame section made on which to mount the scooter 1. The child buggy 100 illustrated is provided by way of example only and it should be appreciated that various other buggy types may also be used without departing from the scope of the invention. Also note that for clarity, the seat portion of the buggy 100 has been removed. The rear wheel 6 of the scooter 1 is located in the second position with rear wheel 6 in a raised configuration so that the deck chassis 2 of the scooter 1 is approximately horizontally aligned.

Figure 3:
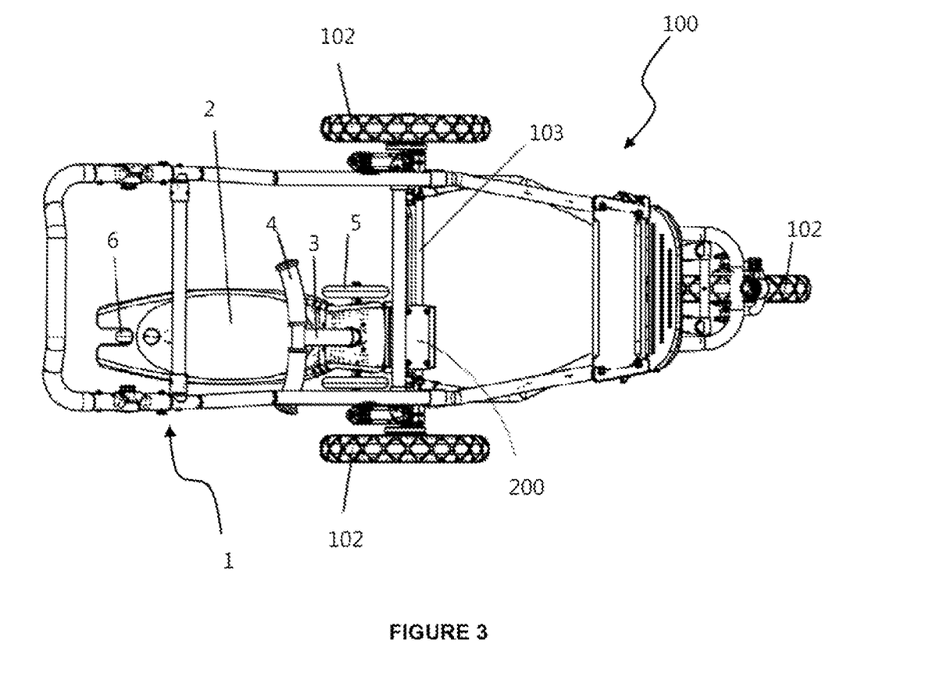
FIG. 3 shows a plan view of the scooter linked to the child buggy.
Figure 4:
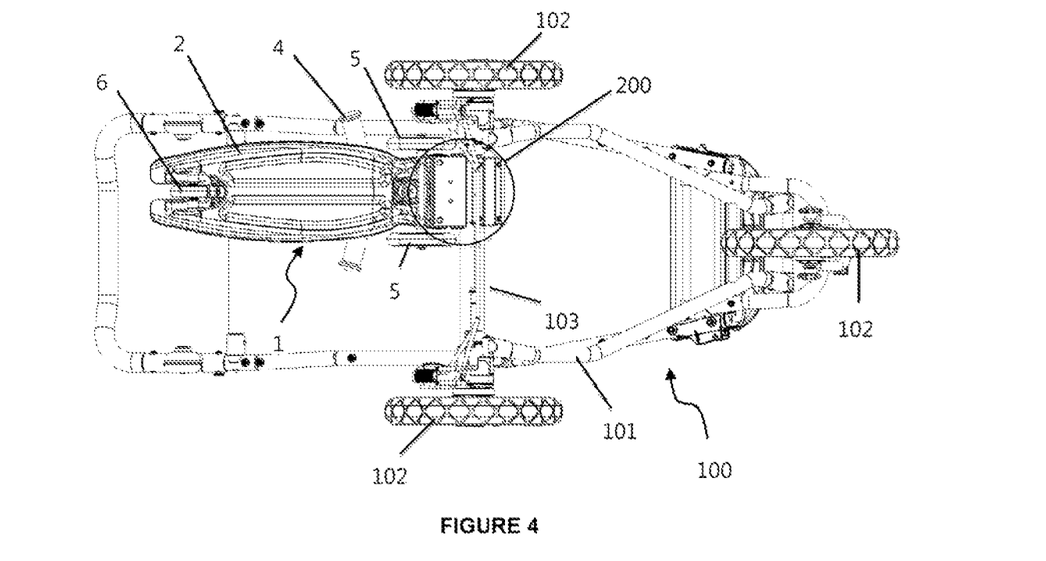
FIG. 4 shows an underside view of the scooter linked to the child buggy.
Figure 5:
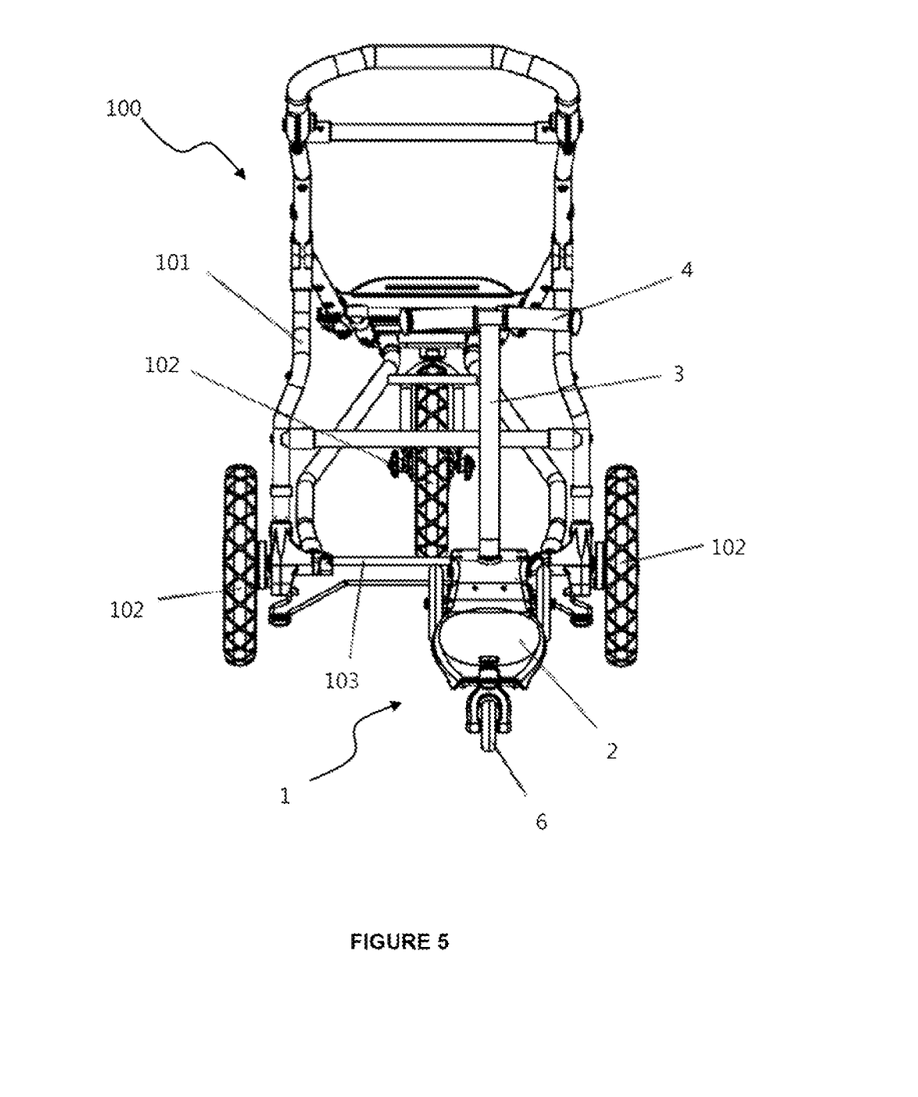
FIG. 5 shows a rear elevation view of the scooter linked to the child buggy.

FIG. 3 illustrates the scooter 1 and child buggy 100 when viewed from above and FIG. 4 illustrates the same configuration when viewed from below. FIG. 5 shows the same configuration when viewed from behind. The linking mechanism 200 is partly visible. In the embodiment shown, the scooter 1 is linked to the crossbar 103 of the child buggy 100 on one side of the crossbar 103. It should be appreciated that the scooter 1 may be also be mounted to the crossbar 103 in a central position or on the opposing side to that illustrated. Linking to one side of the crossbar 103 may be helpful to avoid the buggy 100 user having to stand astride the scooter 1 when linked to the buggy 100.

Figure 6:
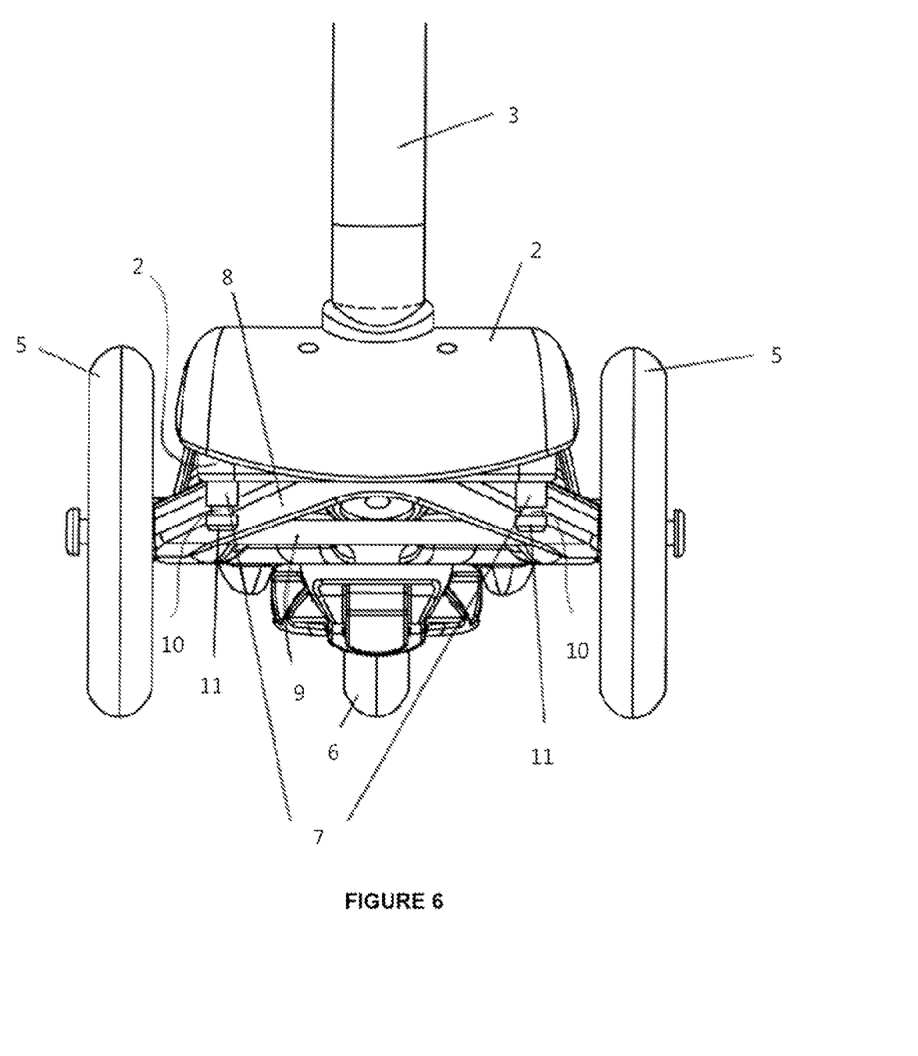
FIG. 6 shows a detail front elevation view of the scooter detached from the child buggy.

FIG. 6 illustrates the front of the scooter 1 when separated from the linking mechanism 200 and child buggy 100. The front view shows the front wheel truck 8 and front wheel axle 9. The linking members 7 are visible being rods 7 extending from the chassis 2. Each rod 7 includes a recessed portion or channel 10 extending around the circumference of the rod 7. The recessed portions 10 are engaged by the linking mechanism plate 206 (described below). The rods 7 may also include guide portions 11 on the ends of the rods 7 to help guide the rods 7 into the linking mechanism apertures 209 (see below). The embodiment illustrated shows two rods 7 however it should be appreciated that only one rod 7 may be used or instead three or more rods 7 may be used without departing from the scope of the invention.

Figure 7:
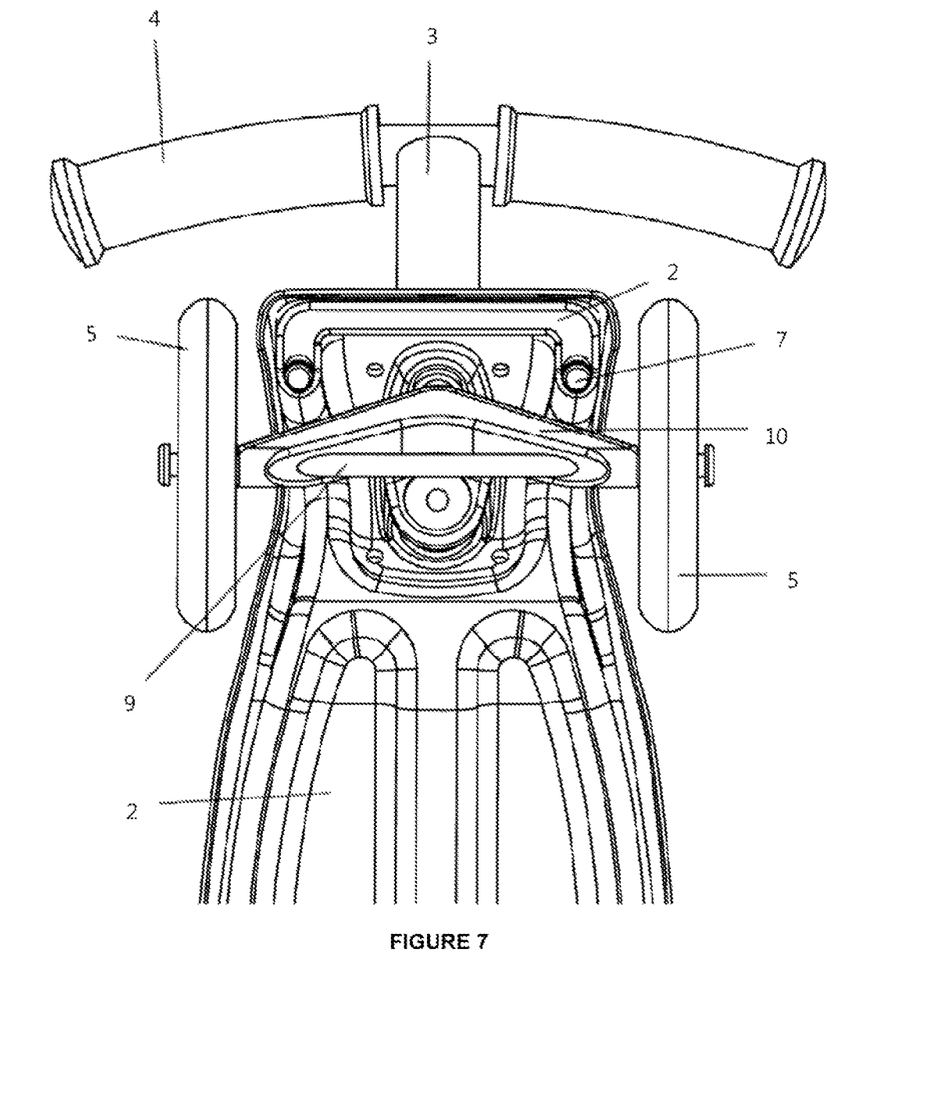
FIG. 7 shows a close up view of the underside of the scooter detached from the child buggy.

FIG. 7 illustrates the underside of the scooter 1 showing the linking members 7 in more detail as well as the front wheels 5, the front wheel truck 8 and front wheel axle 9.

Figure 8:
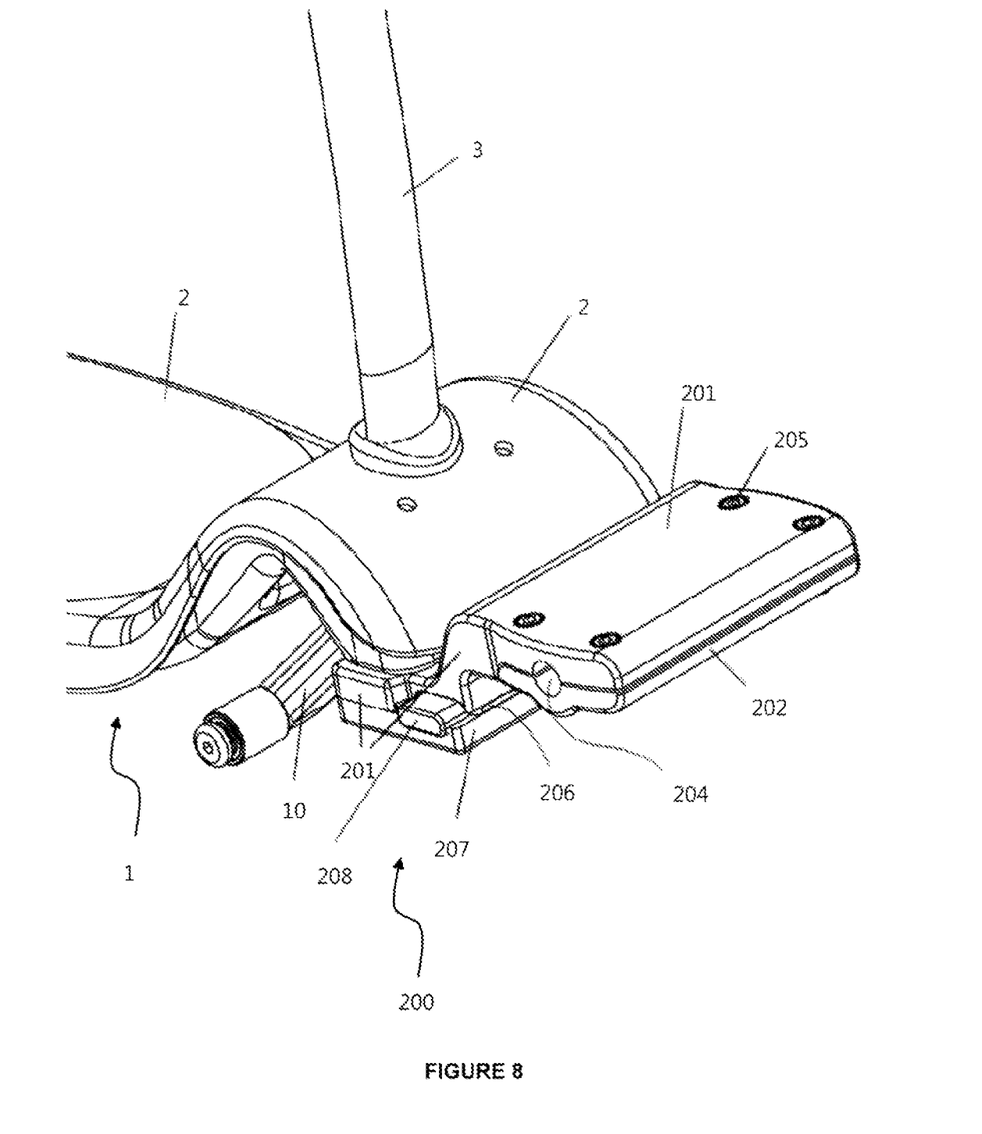
FIG. 8 shows a detail perspective view of the front of the scooter attached to the linking mechanism with the front wheels of the scooter removed.

FIG. 8 shows the front section of the scooter 1 linked to the linking mechanism 200. The front wheels 5 have been removed from the scooter 1 for clarity. The linking mechanism 200 comprises a base section 201 that has a dog-leg cross section and which mates on one end to the child buggy 100 and on the opposing end to the scooter 1. The base section 201 mates with a fixing section 202 about a frame section 101 on the child buggy 100. As discussed above, this may be the frame rear crossbar 103. The base section 201 and fixing section 202 together form a cylindrical recess 204 that is ideally sized to snugly fit the frame 103 tube size. The base section 201 and fixing section 202 are fixed together via one or more mechanical fasteners 205 located around the recess channel 204. The scooter 1 end of the base section 201 comprises a plate 206 located between the base section 201 ending and a plate cover 207. The plate 206 is movable in a horizontal plane relative to the base section 201 and plate cover 207 by pushing an actuator (shown as button 208, one on each side of the plate 206).

Figure 9:
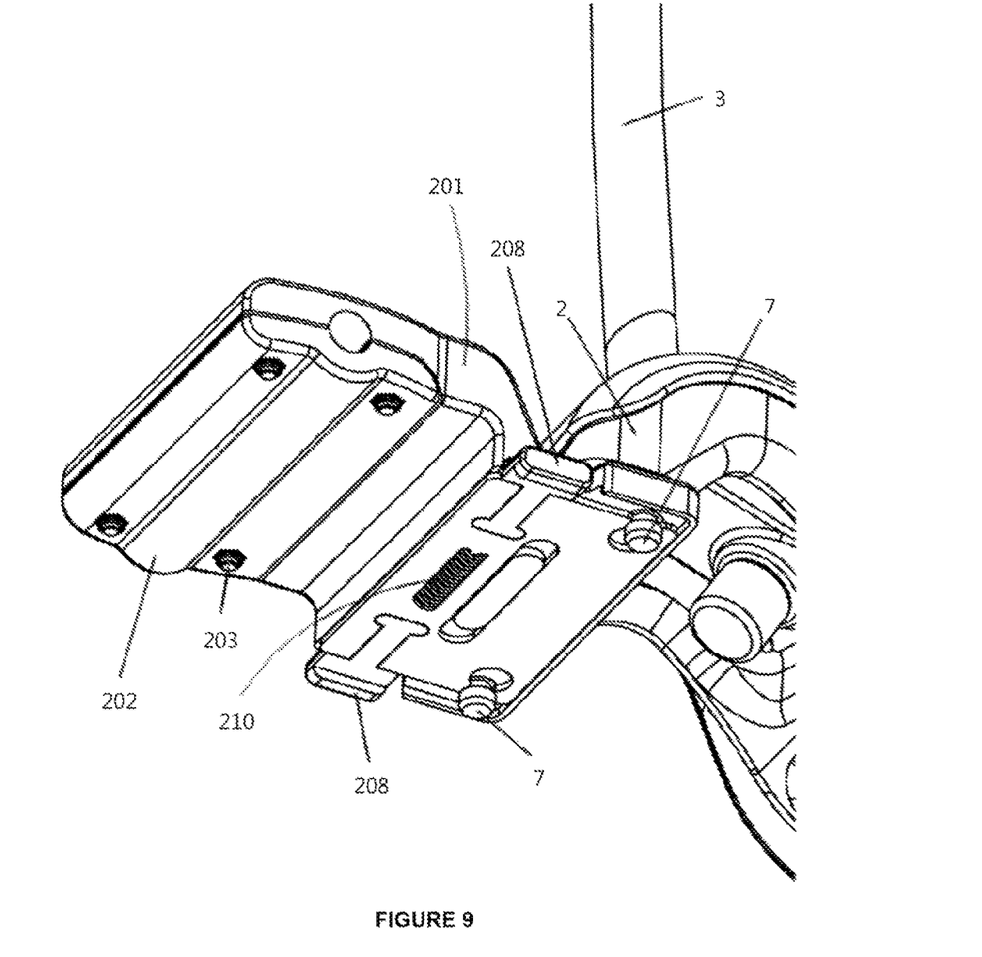
FIG. 9 shows a detail perspective view of the front of the scooter attached to the linking mechanism from the underside with the linking mechanism base section, release plate cover and base section in shadow.
Figure 10:
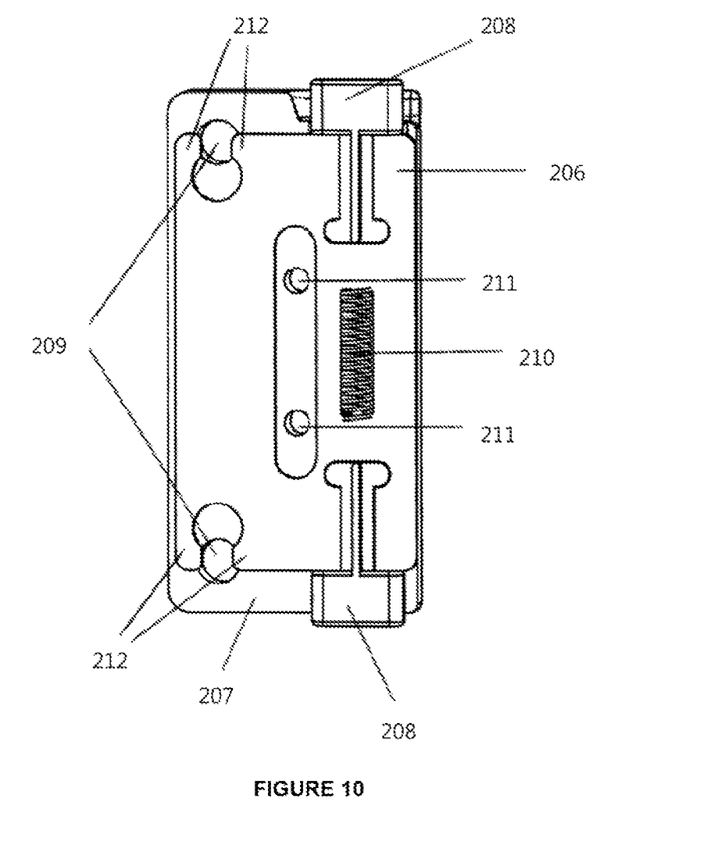
FIG. 10 shows a detail plan view of the release plate cover, plate, actuator and centralising spring.
Figure 11:
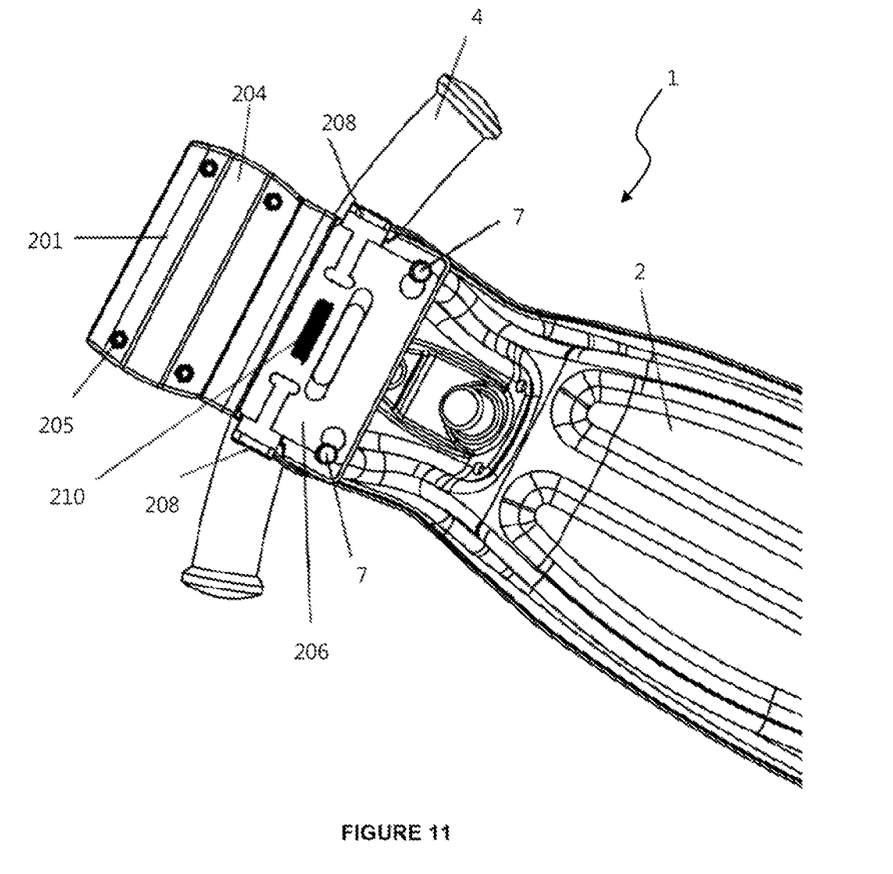
FIG. 11 shows a detailed view of the underside of the scooter and base plate with the cover plate removed.

FIG. 9 shows a similar view to FIG. 8 but the plate cover 207 is removed to show internal details of the linking mechanism 200, FIGS. 10 and 11 also show further views of the linking mechanism 200 and in particular, the link between the scooter linking members 7 and the base section 201 and linking mechanism 200 generally. The scooter 100 linking members 7 are shown in FIGS. 9 and 11 protruding into apertures 209 in the base section 201, plate 206 and plate cover 207. The plate 206 includes protrusions 212 that engage the recesses 10 in the linking members 7 when in the centralised position (as shown in FIGS. 9-11). The plate 206 is maintained in a centralised position via a bias means being a spring 210. Pushing an actuator button 208 forces the plate 206 across in a horizontal direction moving the plate 206 protrusions 212 out of the linking member 7 recesses 10 allowing the linking members 7 to be withdrawn (or inserted into) the apertures 209. When the button 208 is subsequently released the bias spring shifts the plate 206 back into a centralised position engaging the protrusions 212 across the apertures 209 and rod 7 recesses 10 if the rod(s) 7 are present. The base section 201 and plate cover 207 are retained in place via mechanical fasteners 211.

FIGS. 12 to 17 illustrate the rear wheel 6 and the way that the rear wheel 6 of the scooter 1 may be moved between two positions, the aim being to maintain the footrest portion of the deck chassis 2 in a substantially horizontal orientation relative to the ground surface on which the scooter 1 is propelled. The reason this is important is for safety and ease of use, a level platform being important for stability when stood on by the child. As may be appreciated, the height of the front of the chassis 2 varies depending on whether the scooter 1 is linked to the child buggy 100 or not. Linking the scooter 1 to the buggy 100 in some embodiments lifts the front wheels 5 off the ground (see FIG. 2) and hence to achieve a level platform the rear wheel 6 needs to lift the rear of the scooter 1 deck 2. In addition, when linked to the buggy 100 it is important that the rear of the scooter 1 is able to rotate in a horizontal plane otherwise turns of the buggy 100 are inhibited by the rear wheel 6. By contrast, when in the scooter 1 configuration not linked to the buggy 100, the rear wheel 6 needs to be fixed in the horizontal plane and the height dropped to level with the deck footpad 2.

Figure 12:
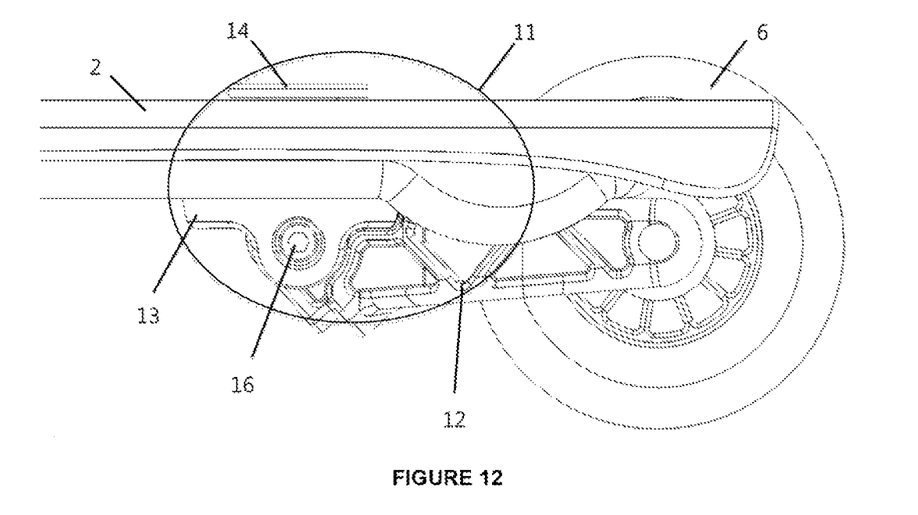
FIG. 12 shows a detailed side elevation of the scooter rear section.
Figure 13:
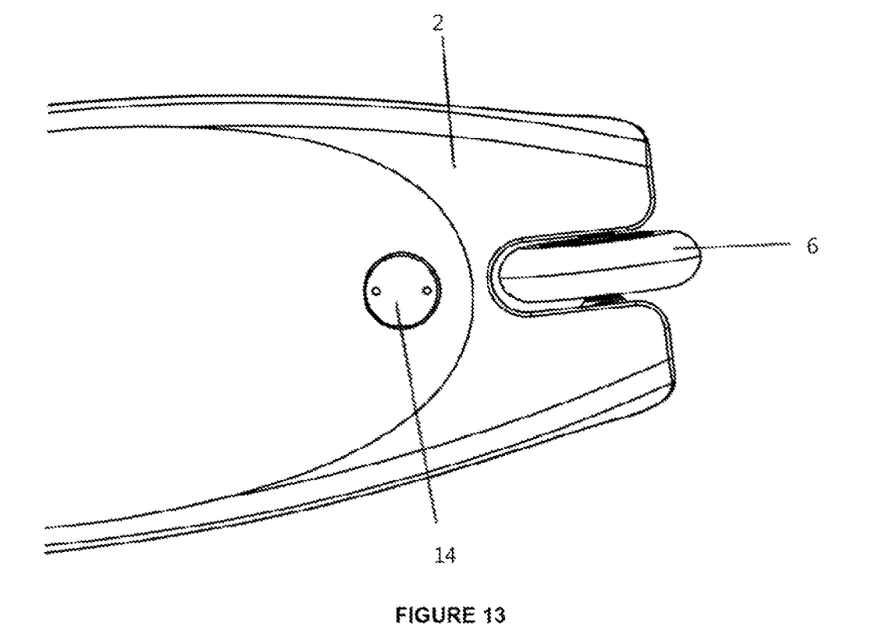
FIG. 13 shows a plan view of the scooter rear section.
Figure 14:
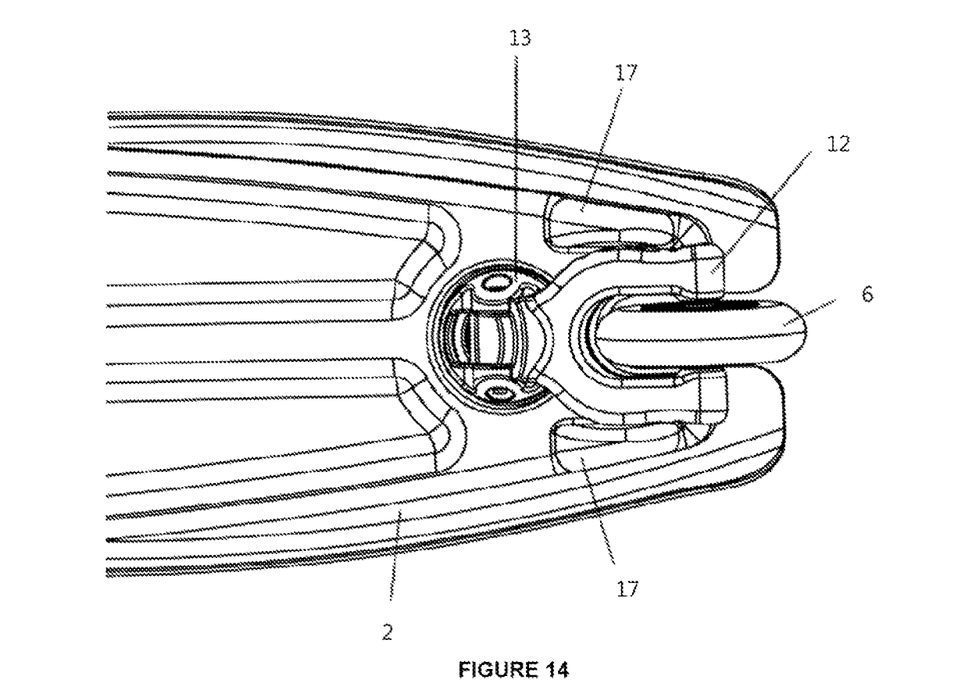
FIG. 14 shows an underside view of the scooter rear section.

As shown in FIG. 12, the rear section of the scooter 100 comprises a rear wheel 6, a deck chassis 2 and a castor assembly generally indicated by arrow 11 comprising a caster and a castor arm 12. The castor comprises a castor swivel base 13, a swivel pivot top 14, a swivel pivot bottom 15 and a castor bolt 16. FIGS. 13 and 14 show the rear section of the scooter 1 in a plan and underside view when in the scooter 1 (un-linked) configuration. As can be seen in FIG. 14, the deck chassis 2 includes two protrusions 17 that extend and which abut the castor arm 12 when the wheel 6 is in the lowered (un-linked) configuration. The two protrusions 17 act to prevent horizontal movement of the arm 12 and rear wheel 6 when in the lowered orientation. This is important to allow proper scooting motion.

Figure 15:
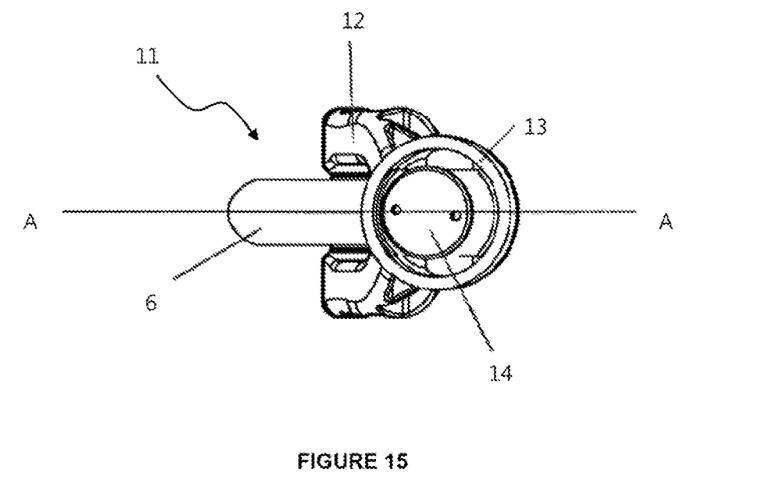
FIG. 15 shows a plan view of the scooter rear wheel and castor assembly with the scooter deck chassis removed.

FIG. 15 shows an underside view of the rear section of the scooter 1 when the wheel 6 is in a raised or buggy 100 linked orientation. The two protrusions 17 from the chassis 2 no longer engage the castor arm 12 and in this configuration the rear wheel 6 is free to swivel up to 360 degrees. This is important when the scooter 1 is linked to the child buggy 100 as it allows free turning motion of the child buggy 100 that would not be the case if the rear wheel 6 were unable to move in all directions.

Figure 16:
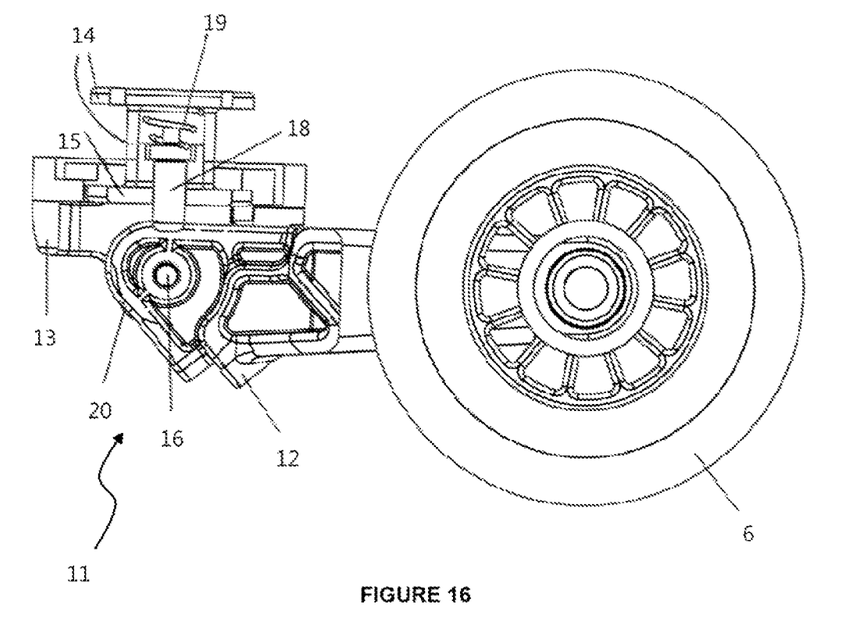
FIG. 16 shows a section side elevation of the scooter wheel and castor assembly with the scooter deck chassis removed.

FIG. 16 shows the rear section of the scooter 1 along section A of FIG. 15. The rear wheel 6 is shown in the scooter 1 (un-linked) configuration. As shown, the swivel pivot top 14 and swivel pivot bottom 15 house a pin 18 and bias means 19. The pin 18 is urged against a cam surface 20 on the exterior of the castor arm 12. The action of the cam 20 may be such that, as the wheel 5 and arm 12 are rotated about a vertical axis between positions, the cam surface 20 urges the biased pin 18 to engage in either a first lowered position or a second raised position. In some embodiments, the cam surface 20 may have ramped surfaces that urge the pin 18 via the bias means 19 to be retained in either the first or second position until forced out of a recess (not shown) by sharp movement of the arm 12 to the new position.

Aspects of the present invention have been described by way of example only and it should be appreciated that modifications and additions may be made thereto without departing from the scope of the claims herein.

We claim:

1. A scooter including:
   (a) a body made up of:
      a deck chassis having a footrest surface;
      a handle bar assembly;
      at least one linking member on the scooter that engages a linking mechanism used to releasably attach the scooter to a child buggy thereby linking the scooter to the child buggy; and
   (b) at least one rear wheel and at least one front wheel each supported by the body and rotatable around an axis, wherein the at least one rear wheel is moveable from a first fixed horizontal position when the scooter is not linked to the child buggy to a second moveable horizontal position when the scooter is linked to the child buggy via the linking mechanism.

2. The scooter as claimed in claim 1, wherein, in the first position, the at least one rear wheel is moved closer to the deck chassis vertically so as to place the footrest surface of the deck chassis in a substantially horizontal alignment with respect to a ground surface when the scooter is not linked to the child buggy.

3. The scooter as claimed in claim 1, wherein in the second position, the at least one rear wheel is free to rotate in a horizontal plane.

4. The scooter as claimed in claim 1, wherein, in the second position, the at least one rear wheel is moved away from the deck chassis vertically so as to place the footrest surface of the deck chassis in a substantially horizontal alignment with respect to the ground surface when the scooter is linked to the child buggy.

5. The scooter as claimed in claim 1, wherein the at least one rear wheel pivots between the first and second position around a vertical axis located on a castor assembly.

6. The scooter as claimed in claim 5, wherein the castor assembly includes:
   a castor base, a swivel pivot top and swivel pivot bottom; and
   a castor arm linking the at least one rear wheel and castor.

7. The scooter as claimed in claim 5, wherein the castor assembly includes a pin therein that is biased via a bias means towards a cam surface on the castor arm.

8. The scooter as claimed in claim 7, wherein as the at least one rear wheel and castor arm are rotated about a vertical axis between the first and second positions, the cam surface urges the bias means to engage in either the first position or the second position.

9. The scooter as claimed in claim 7, wherein the cam surface contains ramped surfaces that urge the pin via the bias means to be retained in either the first or second position.

10. The scooter as claimed in claim 1, wherein in the first position the at least one rear wheel is received within an aperture in the deck chassis and the at least one rear wheel is retained in a fixed and horizontal alignment via at least one protrusion from the deck chassis that abuts the castor arm.

11. A method of levelling the footrest surface of a scooter as claimed in claim 1 between a first scooter unattached position and a second scooter buggy attached configuration wherein the method of levelling is completed by the steps of:
   (a) moving the footrest surface in a generally upwards direction by moving the at least one rear wheel position away from the footrest surface to level the footrest surface of the scooter when in a buggy attached configuration; and
   (b) moving the footrest surface in a generally downwards direction by moving the at least one rear wheel position towards the footrest surface to level the footrest surface of the scooter when in a scooter unattached configuration.

\* \* \* \* \*